(12) United States Patent
Sahlén

(10) Patent No.: US 7,559,318 B2
(45) Date of Patent: Jul. 14, 2009

(54) APPARATUS FOR AN INTERNAL COMBUSTION ENGINE

(75) Inventor: Ivar Sahlén, Öckerö (SE)

(73) Assignee: Volvo Lastvagnar AB, Göteborg (SE)

( * ) Notice: Subject to any disclaimer, the term of this patent is extended or adjusted under 35 U.S.C. 154(b) by 227 days.

(21) Appl. No.: 11/574,986

(22) PCT Filed: Sep. 9, 2004

(86) PCT No.: PCT/SE2004/001305

§ 371 (c)(1),
(2), (4) Date: Aug. 6, 2007

(87) PCT Pub. No.: WO2006/028410

PCT Pub. Date: Mar. 16, 2006

(65) Prior Publication Data

US 2008/0264392 A1    Oct. 30, 2008

(51) Int. Cl.
F02B 47/08    (2006.01)
F02B 47/10    (2006.01)

(52) U.S. Cl. .................. 123/568.14; 123/90.19

(58) Field of Classification Search ............ 123/568.14, 123/90.16, 90.17, 90.39, 90.19, 90.4, 90.46, 123/320, 321, 322

See application file for complete search history.

(56) References Cited

U.S. PATENT DOCUMENTS 6,983,725 B2 *    1/2006    Persson .................. 123/90.16

FOREIGN PATENT DOCUMENTS

| EP | 1361344 A2 | 11/2003 |
|---|---|---|
| WO | 03031778 A1 | 4/2003 |
| WO | 03067067 A1 | 8/2003 |

OTHER PUBLICATIONS

International Search Report from corresponding International Application PCT/SE2004/001305.

* cited by examiner

*Primary Examiner*—Mahmoud Gimie
(74) *Attorney, Agent, or Firm*—WRB-IP LLP

(57) ABSTRACT

An apparatus for achieving internal EGR in a four-stroke internal combustion engine which, for each cylinder, has at least one inlet valve and at least one exhaust valve for controlling the connection between combustion chambers in the cylinder and an inlet system and exhaust system respectively. A rotary camshaft with a cam curve is designed to interact with a follower member and has a first lobe portion for generating the normal exhaust valve lift of the engine. The camshaft is provided with a second lobe portion, which has a height measurement over and above its basic curve which falls short of the measurement for normal exhaust valve clearance when driving at low load and accompanying low heat development in the engine. As a result of thermal expansion in the valve mechanism, the height measurement exceeds the measurement for normal exhaust valve clearance when driving at high load and accompanying high heat development in the engine. The second lobe portion is situated within a crankshaft angular range of about 360-480 degrees.

4 Claims, 2 Drawing Sheets

APPARATUS FOR AN INTERNAL COMBUSTION ENGINE

BACKGROUND AND SUMMARY

The present invention relates to an apparatus for achieving internal EGR in a four-stroke internal combustion engine.

Exhaust gas recirculation, so-called EGR, is a widely known method in which some of the total exhaust flow of the engine is recirculated for mixing with incoming air to the cylinders of the engine. It thereby becomes possible to reduce the quantity of nitrogen oxide in the exhaust gases.

This recirculation is usually effected via shunt valves and lines extending on the outside of the engine, from the exhaust side to the inlet side. In certain cases, it is desirable for spatial reasons to be able to achieve EGR-mixing without such arrangements. To this end, it has been proposed to achieve EGR-mixing by utilizing the usual inlet and outlet valves of the engine for the return flow of exhaust gases from the exhaust manifold of the engine to the cylinders, so-called internal EGR (IEGR). This return flow is achieved by an extra opening of the exhaust valve during the working cycle of the engine.

There are pressure surges on the exhaust side which are higher than the cylinder pressure. If the exhaust valve is opened under such a pressure peak, exhaust gases flow backward into the cylinder.

It is known, for example through WO 03/031778, to make use of a two-level valve clearance, for example a mechanically adjusted valve clearance combined with a hydraulically adjusted O-clearance which can be activated/deactivated depending on the operating situation of the engine, for example changing between positive engine power and engine braking (decompression brake) respectively. The extra valve motion which is then activated/deactivated can in this case be hidden beneath the mechanically adjusted valve clearance, but emerges when O-clearance is activated. This method can also be used to activate/deactivate an extra valve motion in order to obtain internal EGR.

WO 03/067067 describes a different valve mechanism having an activable secondary rocker arm which can utilize the usual cam lobe to produce extra valve lift for internal EGR.

With the mechanisms described above, it is therefore possible to activate the internal EGR function, which gives an EGR level predetermined by cam lobe and rocker arm geometry. Usually, the EGR function is optimized for a high r.p.m. range within which the engine is expected to operate. When the engine operates within a lower r.p.m. range, the EGR quantity can become too high, leading to increased fuel consumption and more smoke in the exhaust gases. If this EGR function is not active within this r.p.m. range, the nitrogen oxide emissions increase. It is desirable to be able to obtain lower internal EGR at lower engine speeds.

It is desirable to produce a valve system which allows changing between various EGR levels.

According to an aspect of the present invention, an apparatus for achieving internal EGR in a four-stroke internal combustion engine includes, for each cylinder and piston associated with the cylinder at least one inlet valve and at least one exhaust valve for controlling connection between a combustion chamber in the cylinder and an inlet system and exhaust system respectively. The apparatus also includes, for each cylinder and piston associated with the cylinder, a rotary camshaft with a cam curve designed to interact with a follower member. The cam curve has a first lobe portion for generating a normal exhaust valve lift of the engine and a second lobe portion having a height measurement over and above a basic curve of the camshaft. The height measurement for the second lobe portion falls short of a height measurement for normal exhaust valve clearance when driving at a first load and heat development in the engine, and which height measurement for the second lobe portion, as a result of thermal expansion in the valve mechanism, exceeds the measurement for normal exhaust valve clearance when driving at a second load and heat development in the engine, the second load and heat development being higher than the first load and heat development. The second lobe portion is situated within a crankshaft angular range of about 360-480 degrees.

BRIEF DESCRIPTION OF FIGURES

The invention will be described in greater detail below with reference to illustrative embodiments shown in the appended drawings, in which.

DETAILED DESCRIPTION—

The invention will be described below in connection with a valve mechanism which is described in greater detail in PCT/SE03/01630.

Figure 1:
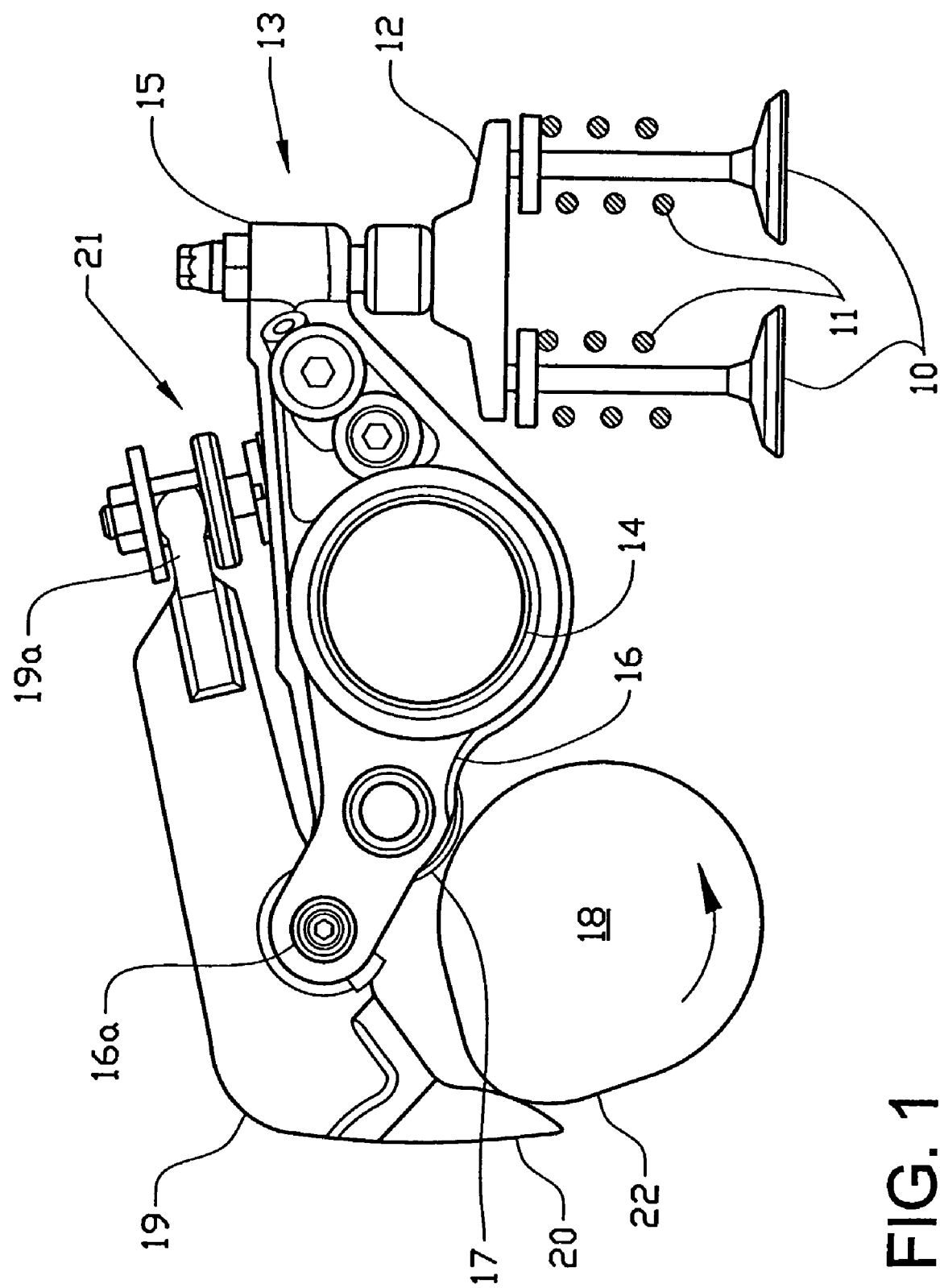
FIG. 1 shows a valve mechanism with a facility for changing between various operating modes according to the invention.

The valve mechanism shown in FIG. 1 is placed on a cylinder head and comprises exhaust valves 10 with valve springs 11 and a common valve yoke 12. The yoke is acted upon by a rocker arm 13, which is mounted pivotably about a rocker arm shaft 14. The rocker arm 13 has on one side of the shaft 14 a valve pusher arm 15 and on the other side a cam follower arm 16, which is provided with a first follower member in the form of a rocker arm roller 17, which normally interacts with a camshaft 18. In addition, the cam follower arm 16 is provided with a secondary arm 19, which is mounted pivotably on the outer end 16a of the arm and is provided with a second follower member in the form of a finger 20.

The secondary arm 19 is switchable between an inactive and an active position by means of a hydraulic piston 21 placed in the rocker arm. This is coupled to the secondary arm 19 in a substantially play-free manner by a fork 19a.

In the inactive position (not shown in FIG. 1), the rocker arm 13 is acted upon by the cam lobe 22 of the camshaft 18 only via the rocker arm roller 17. In the active position (as shown in FIG. 1), the rocker arm 13 is acted upon by the cam ridge 22 of the camshaft, additionally via the finger 20. The geometry of the secondary arm 19 is tailored so that the rocker arm, in the active position, is activated by the cam lobe 22 at the desired phase angle, in this case with a delay of about 80-110 degrees in the direction of rotation of the camshaft 18.

Figure 2:
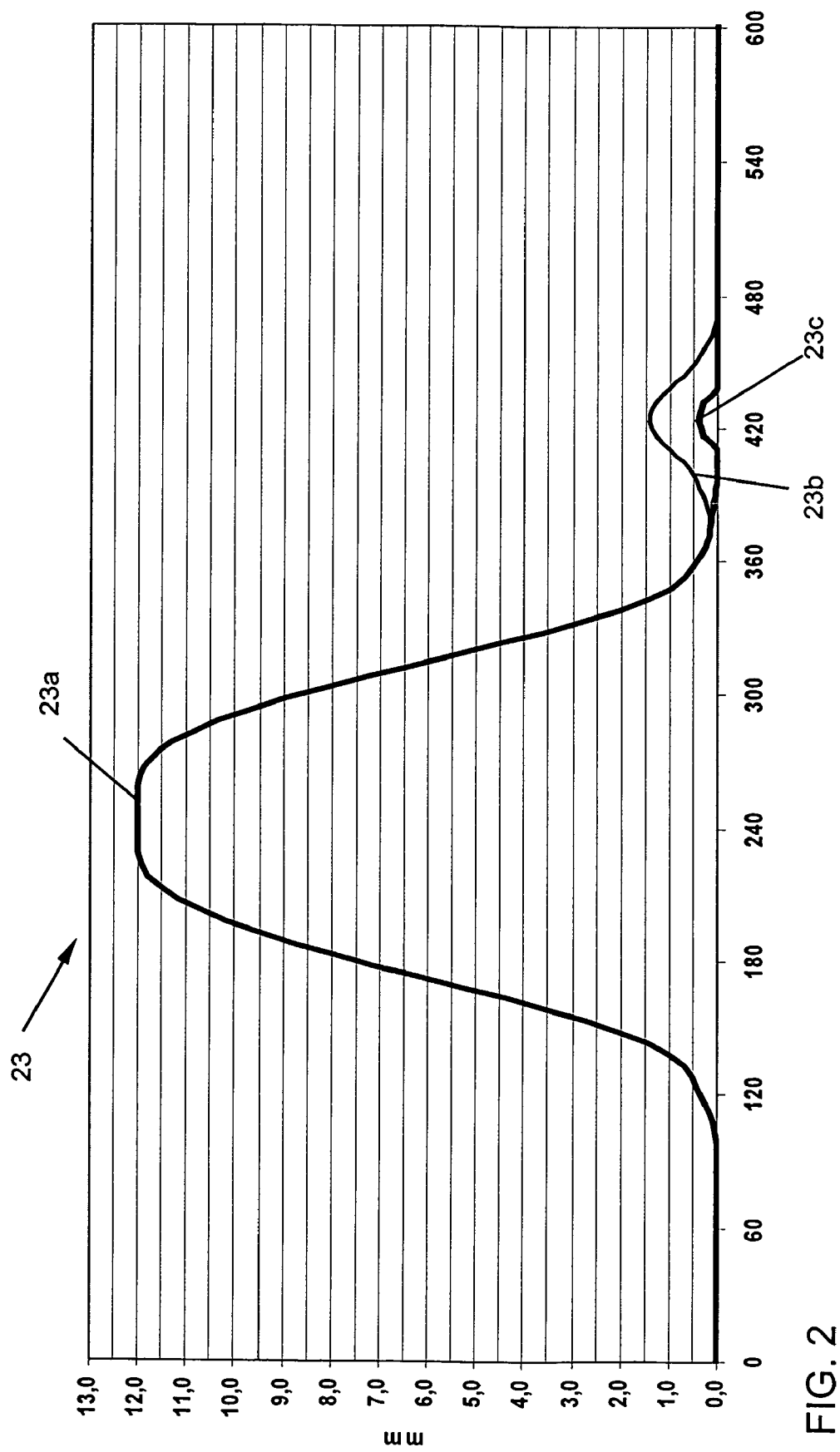
FIG. 2 shows a typical lifting curve for maneuvering of the valve mechanism according to FIG. 1.

FIG. 2 shows a lifting curve 23 which can be used, on the one hand, for conventional valve opening via the rocker arm roller 17 and, on the other hand, for opening the exhaust valve via the finger 20 during an induction stroke of the four-stroke engine, for example to create so-called internal exhaust gas recirculation in the engine (IEGR).

The curve portion 23a here illustrates the main lifting motion of the valve of about 12 millimeters, when the cam ridge 22 passes the rocker arm roller 17. When the cam ridge 22 then acts upon the activated finger 20, the lift of about 1.5 millimeters occurs, as illustrated by the curve portion 23b.

The curve portion 23c shows a further valve lift which can occur when the IEGR main function is not active. To this end, the camshaft 18 is provided with an extra lobe (not shown in FIG. 1), within a crankshaft angular range of about 360-480 degrees, expediently at about 395-455 degrees.

The height measurement of this lobe maximally remains short of the measurement for normal exhaust valve clearance. When driving at high load and accompanying high heat generation in the engine, thermal expansion occurs in the valve mechanism, which means that the extra lobe can act upon the rocker arm roller 17 so that the exhaust valves are given a small lift, in the order of magnitude of about 0.5 millimeters. As an alternative to the valve mechanism which is described above, a valve mechanism described in WO 03/031778 can be used. The main cam curve is here provided with lobes for normal valve lift and temperature-dependent IEGR, while an extra cam curve is provided with a lobe for activable IEGR.

The invention should not be considered limited to the illustrative embodiments described above, but rather a host of further variants and modifications are conceivable within the scope of the following patent claims.

The invention claimed is:

1. An apparatus for achieving internal EGR in a four-stroke internal combustion engine, comprising, for each cylinder and piston associated with the cylinder:
    at least one inlet valve and at least one exhaust valve for controlling connection between a combustion chamber in the cylinder and an inlet system and exhaust system respectively;
    a rotary camshaft with a cam curve designed to interact with a follower member, the cam curve having a first lobe portion for generating a normal exhaust valve lift of the engine and a second lobe portion having a height measurement over and above a basic curve of the camshaft, the height measurement for the second lobe portion falling short of a height measurement for normal exhaust valve clearance when driving at a first load and heat development in the engine, and which height measurement for the second lobe portion, as a result of thermal expansion in the valve mechanism, exceeds the measurement for normal exhaust valve clearance when driving at a second load and heat development in the engine, the second load and heat development being higher than the first load and heat development, wherein the second lobe portion is situated within a crankshaft angular range of about 360-480 degrees.

2. The apparatus as claimed in claim 1, wherein the second lobe portion is situated within a crankshaft angular range of about 395-455 degrees.

3. The apparatus as claimed in claim 1, wherein a second follower member is switchable between an inactive and an active position for provision of internal EGR independent of engine load and heat conditions.

4. The apparatus as claimed in claim 2, wherein a second follower member is switchable between an inactive and an active position for provision of internal EGR independent of engine load and heat conditions.

* * * * *